US010375068B2

(12) United States Patent
Wang et al.

(10) Patent No.: US 10,375,068 B2
(45) Date of Patent: Aug. 6, 2019

(54) METHOD AND APPARATUS FOR AUTHENTICATING A VIRTUAL SUBSCRIBER IDENTITY MODULE

(71) Applicant: SHENZHEN TUGE INFORMATION CO., LTD., Shenzhen (CN)

(72) Inventors: Kaihang Wang, Shenzhen (CN); Heng Zhang, Shenzhen (CN); Jianhua Li, Shenzhen (CN); Hao Zhou, Shenzhen (CN); Xia Zhang, Shenzhen (CN); Junfeng Zhang, Shenzhen (CN)

(73) Assignee: SHENZHEN TUGE INFORMATION CO., LTD., Shenzhen (CN)

( * ) Notice: Subject to any disclaimer, the term of this patent is extended or adjusted under 35 U.S.C. 154(b) by 0 days.

(21) Appl. No.: 16/050,871

(22) Filed: Jul. 31, 2018

(65) Prior Publication Data

US 2018/0337921 A1 Nov. 22, 2018

Related U.S. Application Data

(63) Continuation of application No. PCT/CN2017/070254, filed on Jan. 5, 2017.

(30) Foreign Application Priority Data

Feb. 1, 2016 (CN) .......................... 2016 1 0070716

(51) Int. Cl.
*H04M 3/16* (2006.01)
*H04L 29/06* (2006.01)
(Continued)

(52) U.S. Cl.
CPC ......... *H04L 63/0876* (2013.01); *H04W 8/183* (2013.01); *H04W 8/20* (2013.01);
(Continued)

(58) Field of Classification Search
CPC .. H04L 63/0876; H04W 76/19; H04W 76/30; H04W 8/183; H04W 8/205; H04W 88/02; H04M 1/72519; H04M 1/72422
(Continued)

(56) References Cited

U.S. PATENT DOCUMENTS

2011/0034172 A1* 2/2011 Sahara .................. H04W 56/00
455/436
2016/0157085 A1* 6/2016 Yeoum .................. H04M 3/387
455/435.1

(Continued)

*Primary Examiner* — Danh C Le

(57) ABSTRACT

Embodiments of the present invention provide a method and apparatus for authenticating a virtual subscriber identity module (VSIM). The method includes: establishing a first connection with a mobile communication network according to a removable subscriber identity module (RSIM); acquiring VSIM information sent by a VSIM server via the first connection, the VSIM information comprising a subscriber identification number; initiating a registration process to a network side according to the VSIM information; acquiring an authentication request, the authentication request carrying an authentication parameter to request for authentication for the VSIM; sending the authentication parameter to the VSIM server, such that the VSIM server determines an authentication response parameter according to the authentication parameter; and acquiring the authentication response parameter sent by the VSIM server, and performing authentication according to the authentication response parameter.

12 Claims, 7 Drawing Sheets

(51) Int. Cl.
*H04W 8/20* (2009.01)
*H04W 76/19* (2018.01)
*H04W 76/30* (2018.01)
*H04W 8/18* (2009.01)
*H04W 12/06* (2009.01)
*H04M 1/725* (2006.01)
*H04W 88/02* (2009.01)

(52) U.S. Cl.
CPC ........... *H04W 8/205* (2013.01); *H04W 12/06* (2013.01); *H04W 76/19* (2018.02); *H04W 76/30* (2018.02); *H04M 1/72519* (2013.01); *H04M 1/72522* (2013.01); *H04W 88/02* (2013.01)

(58) Field of Classification Search
USPC ........................ 455/411, 558, 550.1; 370/350
See application file for complete search history.

(56) References Cited

U.S. PATENT DOCUMENTS

| | | | |
|---|---|---|---|
| 2016/0241722 A1* | 8/2016 | Hao | H04W 12/04 |
| 2016/0261596 A1* | 9/2016 | Khello | H04W 12/08 |
| 2017/0134945 A1* | 5/2017 | Goel | H04W 76/38 |
| 2017/0196027 A1* | 7/2017 | Hao | H04W 76/10 |
| 2017/0230351 A1* | 8/2017 | Hallenborg | H04L 63/08 |
| 2018/0041541 A1* | 2/2018 | Marsden | H04W 4/14 |
| 2018/0146421 A1* | 5/2018 | Zhang | H04W 48/18 |

\* cited by examiner

METHOD AND APPARATUS FOR AUTHENTICATING A VIRTUAL SUBSCRIBER IDENTITY MODULE

CROSS-REFERENCE TO RELATED APPLICATIONS

The present application is a continuation of international application No. PCT/CN2017/070254 filed on Jan. 5, 2017, which claims priority to Chinese Patent Application No. 201610070716.8, filed on Feb. 1, 2016, both of which are hereby incorporated by reference in their entirety.

TECHNICAL FIELD

Embodiments of the present invention relate to the field of communications technologies, and in particular, relate to a method and apparatus for authenticating a virtual subscriber identity module (VSIM).

BACKGROUND

A subscriber identity module (hereinafter abbreviated as SIM) is a microprocessor chip storing required data in a mobile device in such communication modes as GSM, UMTS, 4G or other future modes, which is intended to identify a mobile device in a mobile communication network and enable the mobile device to access to a specific communication network. Generally, a SIM card covers a USIM card and a SIM card.

When using the mobile communication network of another service provider, for example, during an international travel, a user needs to pay for roaming fees. In the case of the international travel, the user may access a local mobile communication network by using a local SIM card during the travel. However, since the personal SIM card of the user is removed during the travel, personal data stored on the SIM card may not be extracted by the user, which may bring troubles to the user.

SUMMARY

Embodiments of the present invention provide a method for authenticating a VSIM, to solve the problem that during an international travel, a user needs to replace the original SIM card with a local SIM card to access a local communication network without paying for high roaming fees.

An embodiment of the present invention provides a method for authenticating a VSIM, which includes:
establishing a first connection with a mobile communication network according to a removable subscriber identity module (RSIM) in a terminal; acquiring VSIM information sent by a VSIM server via the first connection, the VSIM information including a subscriber identification number of the VSIM; initiating a registration request to a network side according to the VSIM information; acquiring an authentication request for authentication for the VSIM, the authentication request carrying an authentication parameter to request for authentication for the VSIM; sending the authentication parameter in the authentication request to the VSIM server, such that the VSIM server determines an authentication response parameter according to the authentication parameter; and acquiring the authentication response parameter sent by the VSIM server, and performing authentication according to the authentication response parameter.

Another embodiment of the present invention further provides a method for authenticating a VSIM, wherein the sending the authentication parameter to the VSIM server includes sending the authentication parameter to the VSIM server via the first connection; the acquiring the authentication response parameter sent by the VSIM server includes: acquiring, via the first connection, the authentication response parameter sent by the VSIM server; and the method further includes: sending an uplink synchronous frame of the VSIM via the first connection.

Another embodiment of the present invention further provides a method for authenticating a VSIM, wherein upon the acquiring the VSIM information, the method further includes: disabling the first connection; and upon the acquiring an authentication request, the method further includes: establishing a second connection with the mobile communication network according to the RSIM; and sending the uplink synchronous frame of the VSIM via the second connection.

Another embodiment of the present invention further provides an apparatus for authenticating a VSIM, which includes:
a first connection establishing module, configured to establish a first connection with a mobile communication network according to a removable subscriber identity module (RSIM) in a terminal; a third acquiring module, configured to acquire, via the first connection, VSIM information sent by a VSIM server, the VSIM information including a subscriber identification number of the VSIM; a first registration initiating module, configured to initiate a registration request to a network side according to the VSIM information; a first acquiring module, configured to acquire an authentication request for authentication for the VSIM, the authentication request carrying an authentication parameter to request for authentication for the VSIM; a first sending module, configured to send the authentication parameter acquired by the first acquiring module to the VSIM server, such that the VSIM server determines an authentication response parameter according to the authentication parameter; a second acquiring module, configured to acquire the authentication response parameter sent by the VSIM server; and an authenticating module, configured to perform authentication according to the authentication response parameter acquired by the second acquiring module.

Another embodiment of the present invention further provides apparatus for authenticating a VSIM, wherein the first sending module is configured to send, via the first connection, the authentication parameter acquired by the first acquiring module to the VSIM server; the second acquiring module is configured to acquire, via the first connection, the authentication response parameter sent by the VSIM server; and the apparatus further includes: a third sending module, configured to send an uplink synchronous frame of the VSIM via the first connection.

Another embodiment of the present invention further provides apparatus for authenticating a VSIM, which further includes:
a first connection disabling module, configured to disable the first connection established by the first connection establishing module; a second registration initiating module, configured to initiate registration to the network side according to the VSIM information after the connection disabling module disables the first connection; a second connection establishing module, configured to establish a second connection with the mobile communication network according to the RSIM after the first acquiring module acquires the authentication request; and a fourth sending module, configured to send the uplink synchronous frame of the VSIM via the second connection.

With the method and apparatus for authenticating a VSIM according to the embodiments of the present invention, after an authentication request of the VSIM is acquired, an authentication parameter is sent to a VSIM server, such that the VSIM server determines an authentication response according to the authentication parameter. Afterwards, an authentication response parameter is acquired from the VSIM server, such that the VSIM is authenticated by using only a few roaming resources, and that a mobile terminal is capable of accessing a mobile communication network via the VSIM.

BRIEF DESCRIPTION OF THE DRAWINGS

To describe embodiments of the present invention or the technical solution in the prior art, hereinafter, drawings that are to be referred for description of the embodiments or the prior art are briefly described. Apparently, the drawings described hereinafter merely illustrate some embodiments of the present invention. Persons of ordinary skill in the art may also derive other drawings based on the drawings described herein without any creative effort.

DETAILED DESCRIPTION

To make the objectives, technical solutions and advantages of the embodiments of the present invention clearer, the technical solutions according to the embodiments of the present invention are clearly and thoroughly described with reference to the accompanying drawings of the embodiments of the present invention. The described embodiments are merely exemplary ones, but are not all the embodiments of the present invention. Based on the embodiments of the present invention, all other embodiments derived by persons of ordinary skill in the art without any creative efforts shall fall within the protection scope of the present invention.

In the embodiments of the present invention, the mobile communication network includes cellular networks in various communication modes, for example, various communication systems, such as the current 2G and 3G communication systems and the next generation communication system, including: the global system for mobile communication (GSM) system, the code division multiple access (CDMA) system, the code division multiple access (TDMA) system, the Wideband code division multiple access wireless (WCDMA) system, the frequency division multiple access (FDMA) system, the orthogonal frequency-division multiple access (OFDMA) system, the general packet radio service (GPRS) system, the universal mobile telecommunications (UMTS) system, the long term evolution (LTE), and other such communication systems.

The terms "system" and "network" may be interchangeably used herein. The term "and/or" used herein mainly signify a correlation between objects linked by this term, and denotes three possible relationships. For example, A and/or B may denote: singularly A, both A and B, and singularly B. In addition, the character "/" generally denotes an "or" relationship between two objects linked by this character.

In addition, herein in this specification, the "SIM card" is intended to cover a USIM card and a SIM card, and cover a universal integrated circuit card (UICC) running a SIM or USIM application or an RUIM application in CDMA.

When a mobile terminal is started up and registered to the network, authentication is needed for location update, activation and deactivation of supplementary services, and calling processes. For ease of description, when examples are listed in the embodiments of the present invention, the cause to the authentication may be described by using one of the above situations as an example, which is not intended to represent exclusion of other possible situations in the embodiments of the present invention.

Figure 1:
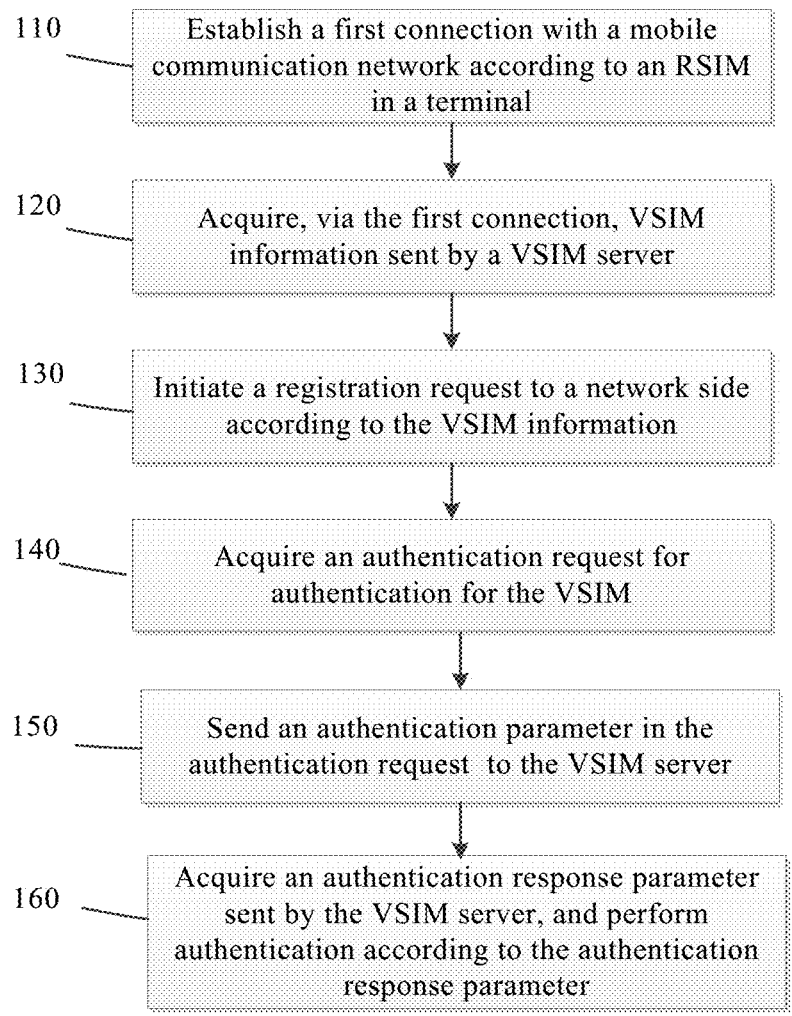
FIG. 1 is a flowchart of a method for authenticating a VSIM according to one embodiment of the present invention.

FIG. 1 is a flowchart of a method for authenticating a VSIM according to one embodiment of the present invention. As illustrated in FIG. 1, the method for authenticating a VSIM according to the present invention includes the following steps:

Step 110: A first connection with a mobile communication network is established according to an RSIM in a terminal.

An RSIM card is arranged in a mobile terminal, and this RSIM card may be coupled to a SIM card circuit in the mobile terminal via a card slot. For example, after the mobile terminal is started up, the mobile terminal is registered to the network via the RSIM, and a data channel is enabled after Packet Data Protocol (PDP) is activated.

In this step, the RSIM of the mobile terminal may establish a first connection with the mobile communication network via a method or protocol in the related art. It should be understood that the SIM card includes key data, that is, an international mobile subscriber identification number (hereinafter abbreviated as IMSI). The IMSI includes a mobile country code (MCC) and a mobile network code (MNC), and the IMSI uniquely identifies a SIM card and may be read from the SIM card when a mobile phone is started up and then sent to the mobile communication network. The mobile communication network may identify the mobile terminal via the IMSI, thereby starting authentication to establish a connection.

Using GSM as an example, when detecting that the mobile terminal is logged in to (registered), the mobile communication network generates a RAND (for example, the RAND may be random data in 16 bytes) and sends the RAND to the mobile terminal; the mobile terminal sends the RAND to the SIM card; the SIM card conducts an operation by using the RAND and a secret key (Ki) thereof to generate an SRES and send the SRES to the mobile terminal; the mobile terminal forwards the SRES to the mobile communication network; the mobile communication network also conducts a corresponding algorithm operation, determines whether the authentication is successful via comparison of two results, and allows the mobile terminal to log in to the mobile communication network if the authentication is successful.

To be specific, the mobile terminal establishes the first connection with the mobile communication network via the removable SIM card, wherein the removable SIM card may be a SIM card built in the mobile terminal or may be a SIM card coupled to the mobile terminal via a card slot. When the mobile communication network requires the authentication, an authentication circuit in the SIM card calculates and determines an authentication response according to an authentication parameter.

When a user travels abroad and the mobile terminal initiates registration to the mobile communication network in a roamed region via the SIM card coupled in the mobile terminal, the mobile communication network judges a country that the removable SIM card pertains to and operator information via the IMSI corresponding to the RSIM card reported by the mobile terminal. When the mobile terminal is successfully registered via the RSIM card, the first connection for international roaming is established via the RSIM card. The mobile terminal may be connected to, or communicate with another device in the mobile communication network via the established first connection. For example, in an embodiment of the present invention, the mobile terminal may communicate with a VSIM server via the first connection established between the RSIM card and the mobile communication network. For example, information, indicating where the mobile terminal is currently located, which is obtained after the mobile terminal is successfully registered via the RSIM is sent to the VSIM server. Still for example, an MCC or an MNC is sent to the VSIM server, the authentication parameter in an authentication request acquired by the mobile terminal from the network is sent to the VSIM server, and authentication response information is acquired from the VSIM server. It may be understood that sending, by the mobile terminal, the location information that is successfully registered according to the RSIM card may enable the VSIM server to allocate one SIM card number from a plurality of SIM cards of the VSIM server to the mobile terminal according to the current location of the mobile terminal. In this step, the specific content regarding the communication between the mobile terminal and the VSIM server via the first connection is not given herein any further.

In step 120, VSIM information sent by the VSIM server is acquired via the first connection, wherein the VSIM information includes a subscriber identification number of the VSIM.

The mobile terminal acquires, via the first connection, the VSIM information sent by the VSIM server, wherein the VSIM information includes IMSI information of a VSIM. It may be understood that the VSIM server may allocate a VSIM to the mobile terminal by sending the VSIM information to the mobile terminal. It may be still understood that the IMSI uniquely corresponds to one SIM card, and the VSIM server may send the IMSI of the allocated VSIM to the mobile terminal. In this step, the VSIM information sent by the VSIM server is acquired via the first connection, wherein the VSIM information includes the IMSI. It may be still understood that one IMSI uniquely corresponds to one RSIM card in the VSIM server.

In step 130, registration request is initiated to a network side according to the VSIM information.

When receiving the VSIM information sent by the VSIM server, the mobile terminal initiates registration to the network side according to the IMSI information in the VSIM information. When initiating registration to the network side according to the IMSI information, the mobile terminal may send to the mobile communication network an IMSI number sent by the VSIM server, and log in to the mobile communication network via the IMSI. It should be noted that it may be determined according to the related art and conventional protocols as to which mode of mobile communication network the mobile terminal initiates registration, which is not limited in the present invention. It may be understood that the mobile communication network which the IMSI sent via the VSIM server logs in to may be different from or may be the same as the mobile communication network that establishes the first connection with the mobile terminal via the RSIM card, which is not limited in the present invention. For ease of description, in an embodiment of the present invention, the mobile communication network that establishes the first connection with the mobile terminal via the RSIM card is called a first mobile communication network, and the mobile communication network that establishes a second connection with the mobile terminal via the IMSI corresponding to the VSIM is called a second mobile communication network. Upon receiving a registration request, the mobile communication network may initiate an authentication request, and send the authentication request to the mobile terminal.

In step 140, an authentication request for authentication for the VSIM is acquired, the authentication request carrying an authentication parameter to request for authentication for the VSIM.

Using a UMTS network as an example, when acquiring the IMSI sent by the VSIM server, a VSIM module of the mobile terminal may initiate registration to the second mobile communication network according to the IMSI; and a mobile switching center (hereinafter referred to as MSC) and a visitor location register (hereinafter referred to as VLR) of the second mobile communication network select the authentication parameter from authentication data, and send the authentication request to the mobile terminal, wherein the request carries parameters of RAND, AUTN and CKSN in the selected authentication parameter. The authentication parameter and a computation rule of the mobile communication network in various modes may be defined by conventional protocols of the mobile communication network in various modes, which is not defined in an embodiment of the present invention.

In this step, the mobile terminal acquires the authentication request issued by the network side, wherein the authentication request carries the authentication parameter to perform the authentication for the VSIM. It should be noted that, in an embodiment of the present invention, an authentication circuit of the VSIM is configured in the VSIM server. For example, a plurality of RSIM cards are configured in the VSIM server, and authentication calculation is performed by using the authentication circuit of the SIM card configured in the VSIM server as the VSIM of the mobile terminal.

In this step, the mobile terminal acquires the authentication request sent by the network side, and the specific content of the authentication request may vary according to the different modes of the mobile communication network, which may be specifically performed according to provisions of the related art and conventional protocols. Using the UMTS network as an example, in this step, the mobile terminal acquires an authentication parameter RAND in the authentication request. It may be understood that the specific steps and parameters using which the mobile communication network in various modes performs authentication to the mobile terminal and the mobile terminal performs authentication for the network side are defined in the related art. The specific authentication process and parameters are not defined in an embodiment of the present invention. In this step, the mobile terminal acquires an authentication request sent by the second mobile communication network, wherein the authentication request carries the authentication parameter to perform the authentication for the VSIM.

In step 150, the authentication parameter in the authentication request is sent to the VSIM server, such that the VSIM server determines an authentication response parameter according to the authentication parameter.

Using the UMTS network as an example, upon acquiring the authentication request from the network side, the mobile terminal calculates an RES, and sends the RES to the MSC and the VLR. The MSC and the VLR compare their calculated XRES with the RES returned by the mobile terminal. If the RES is the same as the XRES, the user is authorized, authentication of the user is successful, and the mobile terminal is allowed to access the network; otherwise, the user is unauthorized, authentication of the user is unsuccessful, and the mobile terminal's access to the network is denied.

However, in an embodiment of the present invention, since the authentication circuit for performing authentication calculation is configured in the VSIM server, upon acquiring the authentication request, the mobile terminal sends the authentication parameter in the authentication request to the VSIM server, such that the authentication circuit of the SIM card configured in the VSIM server determines an authentication response parameter according to the authentication parameter. To be specific, the authentication parameter for performing authentication calculation by the authentication circuit of the RSIM card configured in the VSIM server may be sent to the VSIM server.

In step 160, the authentication response parameter sent by the VSIM server is acquired, and authentication is performed according to the authentication response parameter.

In this step, the mobile terminal acquires the authentication response parameter sent by the VSIM server. It may be understood that the authentication response parameter is the authentication parameter in the authentication request issued by the second mobile communication network and acquired according to the mobile terminal, and calculated and determined by the authentication circuit of the SIM card in the VSIM server. Upon acquiring the authentication response parameter from the VSIM server, the mobile terminal sends the authentication response parameter to the network side to which the VSIM is to be registered, for authentication.

In an embodiment of the present invention, when the VSIM of the mobile terminal initiates a registration event or other events triggering the authentication to the second mobile communication network, upon receiving the authentication request issued by the second mobile communication network, the mobile terminal sends the authentication parameter in the authentication request to the VSIM server, and performs authentication by using the authentication response parameter acquired from the VSIM server. In this way, the VSIM is authenticated by using only a few roaming resources, and the mobile terminal is capable of conveniently accesses the network via the VSIM.

Further, the method according to this embodiment further includes: sending an uplink synchronous frame of the RSIM. In this step, the uplink synchronous frame of the RSIM card is sent to the first mobile communication network which the RSIM card is logged in to according to the RSIM card. A downlink synchronous frame issued by the network side may be received while the uplink synchronous frame of the RSIM is sent to the network side. The specific implementation of sending the uplink synchronous frame and receiving the downlink synchronous frame is not defined in an embodiment of the present invention, which may be specifically implemented according to the related art and conventional protocols.

Figure 2:
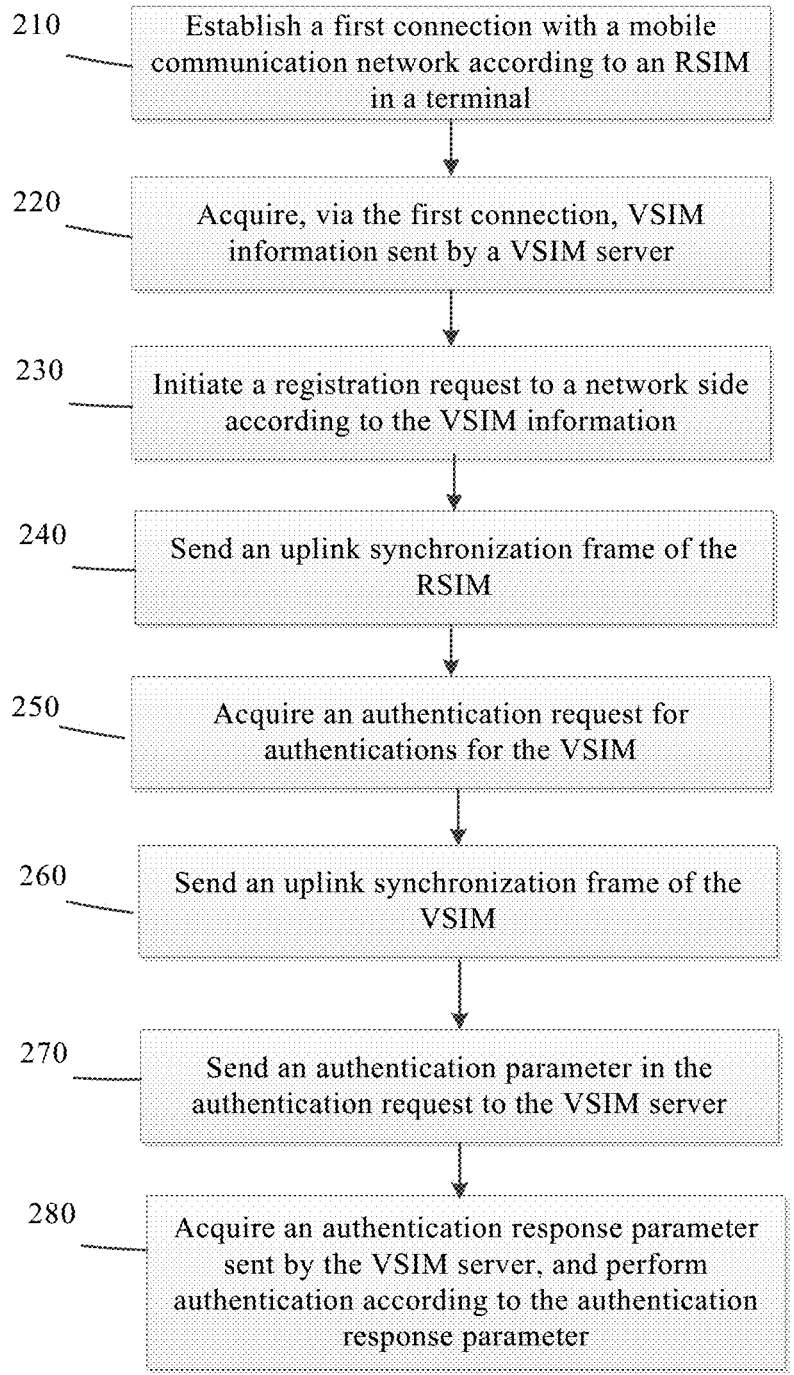
FIG. 2 is a flowchart of a method for authenticating a VSIM according to another embodiment of the present invention.

FIG. 2 is a flowchart of a method for authenticating a VSIM according to another embodiment of the present invention. As illustrated in FIG. 2, the method for authenticating a VSIM according to the present invention includes the following steps:

In step 210, a first connection with a mobile communication network is established according to an RSIM in a terminal.

A mobile terminal establishes the first connection with the mobile communication network via an RSIM card, wherein the RSIM card may be a SIM card built in the mobile terminal or may be a SIM card coupled to the mobile terminal via a card slot. It may be understood that when a user travels abroad and the mobile terminal initiates registration to a roaming region via an original SIM card, a network may judge a country that the SIM card pertains to and operator information via the IMSI corresponding to the RSIM card reported by the mobile terminal. When the mobile terminal is successfully registered via the RSIM card, the first connection of international roaming is established. The mobile terminal may be connected to, or communicate with another device in the mobile communication network via the established first connection. For example, in an embodiment of the present invention, the mobile terminal may communicate with a VSIM server via the first connection established between the RSIM card and the mobile communication network. For example, information, indicating where the mobile terminal is currently located, which is obtained after the mobile terminal is successfully registered via the RSIM is sent to the VSIM server. Still for example, an MCC or an MNC is sent to the VSIM server, the authentication parameter in an authentication request acquired by the mobile terminal from the network are sent to the VSIM server, and authentication response information is acquired from the VSIM server. It may be understood that sending, by the mobile terminal, the location information that is successfully registered according to the RSIM card may enable the VSIM server to allocate one SIM card number from a plurality of SIM cards of the VSIM server to the mobile terminal according to the current location of the mobile terminal.

In step 220, VSIM information sent by the VSIM server is acquired via the first connection, wherein the VSIM information includes a subscriber identification number of the VSIM.

The VSIM server may allocate a VSIM to the mobile terminal by sending the VSIM information to the mobile terminal. It may be understood that one IMSI uniquely corresponds to one SIM card, and the VSIM server may send the IMSI of the allocated VSIM to the mobile terminal. In this step, the VSIM information sent by the VSIM server is acquired via the first connection, wherein the VSIM information includes the subscriber identification number.

In step 230, a registration request is initiated to a network side according to the VSIM information.

When receiving the VSIM information sent by the VSIM server, the mobile terminal initiates registration to the network side according to the IMSI information in the VSIM information, sends to the mobile communication network an IMSI number sent by the VSIM server, and logs in to the mobile communication network via the IMSI. It may be understood that the mobile communication network which the IMSI sent via the VSIM server logs in to may be different from or may be the same as the mobile communication network that establishes the first connection with the mobile terminal via the RSIM card, which is not limited in the present invention. For ease of description, the mobile communication network that establishes the first connection with the mobile terminal via the RSIM card is called a first mobile communication network, and the mobile communication network that establishes a second connection with the mobile terminal via the IMSI corresponding to the VSIM is called a second mobile communication network.

In step 240, an uplink synchronous frame of the RSIM is sent.

In this step, the uplink synchronous frame of the RSIM card is sent to the first mobile communication network which the RSIM card is logged in to according to the RSIM card. Optionally, in an embodiment of the present invention, a downlink synchronous frame issued by the network side may be received while the uplink synchronous frame of the RSIM is sent. Using sending the uplink synchronous frame as an example, to be specific, when the mobile terminal includes two baseband modules, two radio frequency circuits and two antennas, the uplink synchronous frame of the RSIM card may be sent to the first mobile communication network via the first connection established via the RSIM card, to maintain that the first connection is not released by the network side. Optionally, when the mobile terminal includes one baseband module, two radio frequency circuits and two antennas, that is, the mobile terminal is a dual SIM dual active (hereinafter referred to as DSDA) device, the uplink synchronous frame of the RSIM card is sent to the first mobile communication network via the first connection established by the mobile terminal via the RSIM card, to maintain that the first connection is not released by the network side. Optionally, when the mobile terminal includes one baseband module, two radio frequency circuits and one antennas, that is, the mobile terminal is a dual SIM dual standby (hereinafter referred to as DSDS) device, the uplink synchronous frame of the RSIM card is sent to the first mobile communication network via a signaling link established between the VSIM and the second mobile communication network. For example, a timeslot is allocated on a physical link of the VSIM to send the uplink synchronous frame corresponding to the RSIM. More specifically, for example, the uplink synchronous frame is sent in a puncturing manner, and the link synchronous frame carries a radio network temporary identity (hereinafter referred to as RNTI). When the RNTI corresponding to the mobile terminal is monitored by the network side of the first mobile communication network, the uplink synchronous frame is acquired, to maintain that the first connection is not released by the network side. It should be noted that, to be specific, it may be determined by the protocols employed by the networks in various modes which identity is carried by the uplink synchronous frame. The present invention is described only with reference to same examples, but sets no limitation thereto.

It should be noted that, in an embodiment of the present invention, sequence numbers of the steps do not denote a sequence of the steps. For example, in this embodiment, the step of sending the uplink synchronous frame of the RSIM may be performed while, before, or after initiating the registration according to the VSIM. To be specific, the uplink synchronous frame of the RSIM card may be sent to the first mobile communication network via the first connection according to a predetermined frequency or time.

In step 250, an authentication request is acquired, the authentication request carrying an authentication parameter to request for authentication for the VSIM.

After the mobile terminal initiates registration to the second mobile communication network according to the acquired IMSI, the network side sends an authentication request to perform authentication for the mobile terminal. It may be understood that the authentication performed by the mobile terminal to the network side is also involved in the related art. The specific process and parameters are not defined in the embodiment of the present invention. In this step, the mobile terminal acquires the authentication request sent by the second mobile communication network, wherein the authentication request carries an authentication parameter to perform the authentication for the VSIM. To be specific, upon receiving the IMSI corresponding to the VSIM sent by the mobile terminal, the second mobile communication network performs the authentication for the VSIM according to the IMSI information.

In step 260, an uplink synchronous frame of the VSIM is sent.

In an embodiment of the present invention, upon acquiring the authentication request with respect to the IMSI corresponding to the VSIM sent by the second mobile communication network, the mobile terminal sends the authentication parameter to the VSIM server and acquires an authentication response parameter from the VSIM server, and afterwards, sends the authentication response parameter to the second mobile communication network. For the network side, upon sending the authentication request to the mobile terminal, the network side waits for an authentication response sent by the mobile terminal, and judges whether the IMSI is authorized according to the authentication response sent by the mobile terminal. The mobile terminal sends the uplink synchronous frame of the VSIM to the second mobile communication network which initiates registration according to the IMSI, such that the second mobile communication network does not consider that a problem of link failure exists in the VSIM, and releases a signaling link of the VSIM. It may be determined according to the requirements of different modes of communication systems and the conventional protocols as how to send an uplink synchronous frame and which frequency or which time or frequency point is employed to send the uplink synchronous frame, which is not limited in the present invention. Sequence numbers of the steps in the embodiments of the present invention do not denote a sequence of the steps. For example, in this embodiment, with respect to the mobile terminal, the whole process from acquiring the authentication request to sending authentication response to the network for performing the authentication, the uplink synchronous frame of the VSIM may be sent according to a predetermined frequency or time.

To be specific, in this step, when the mobile terminal includes two baseband modules, two radio frequency circuits and two antennas, the uplink synchronous frame may be sent to the second mobile communication network via the signaling link initiated to the second mobile communication network via the VSIM, to maintain that the signaling link is not released by the network side. To be specific, in this step, when the mobile terminal includes two baseband modules, two radio frequency circuits and two antennas, that is, the mobile terminal is a DSDA device, the uplink synchronous frame may be sent to the second mobile communication network via the signaling link initiated to the second mobile communication network via the VSIM, to maintain that the signaling link is not released by the network side. Optionally, when the mobile terminal comprises one baseband module, two radio frequency circuits and one antennas, that is, the mobile terminal is a DSDS device, the uplink synchronous frame of the VSIM is sent to the second mobile communication network via the first connection established by the RSIM in the mobile terminal and the first mobile communication network. For example, a timeslot is allocated on a physical link of the RSIM, the uplink synchronous frame of the VSIM is sent in a puncturing manner, and the sent uplink synchronous frame carries the RNTI. As such, when acquiring the uplink synchronous frame, the second mobile communication network may identify the mobile terminal to maintain that a signaling connection of the VSIM is not released by the network side. Optionally, in an embodiment of the present invention, a downlink synchronous frame issued by the network side may be received while the uplink synchronous frame of the RSIM is sent.

In step 270, the authentication parameter is sent to the VSIM server, such that the VSIM server determines an authentication response parameter according to the authentication parameter.

In an embodiment of the present invention, since the SIM card corresponding to the VSIM of the mobile terminal is configured in the VSIM server, the corresponding authentication circuit is also configured in the SIM card of the VSIM server. When receiving the authentication parameter of the network, the mobile terminal does not have the acquired the authentication circuit of the IMSI and the authentication parameter, and may not perform the authentication computation. Therefore, the mobile terminal sends the received authentication parameter to the VSIM server via the first connection, such that the SIM card corresponding to the IMSI in the VSIM server determines the authentication response parameter according to the authentication parameter.

In step 280, the authentication response parameter sent by the VSIM server is acquired, and authentication is performed according to the authentication response parameter.

The VSIM server receives the authentication parameter sent by the mobile terminal. The corresponding RSIM card may calculate the authentication response according to the authentication parameter, and send the authentication response determined via calculation to the mobile terminal. In this step, the mobile terminal may acquire, via the first connection, the authentication response parameter sent by the VSIM server, and perform the authentication to the second mobile communication network by using the authentication response parameter according to the related art and conventional protocols.

In the embodiment of the present invention, the mobile terminal establishes a first connection with the mobile communication network via the RSIM, acquires VSIM information from the VSIM via the first connection, initiates registration to the network via an IMSI, meanwhile sends an uplink synchronous frame of the RSIM to the first mobile communication network, and sends the uplink synchronous frame to the network to which registration is initiated via the VSIM when the mobile terminal sends an authentication parameter to the VSIM server and acquires an authentication response form the VSIM server. According to the embodiment of the present invention, when the VSIM process of the mobile terminal waits for the authentication response sent by the VSIM server, the mobile terminal sends the uplink synchronous frame to the second mobile communication network, to maintain that a signaling link established between the mobile terminal and the second mobile communication network via the VSIM is not asynchronous. Further, according to the embodiment of the present invention, the method of sending an uplink synchronous frame is employed, and the connection may be maintained by sending less data. In this way, the signaling link of the VSIM may be maintained to be not asynchronous when the VSIM process waits for the authentication response parameter from the VSIM server with fewer radio resources are consumed, and thus the authentication may be successfully performed.

Figure 3:
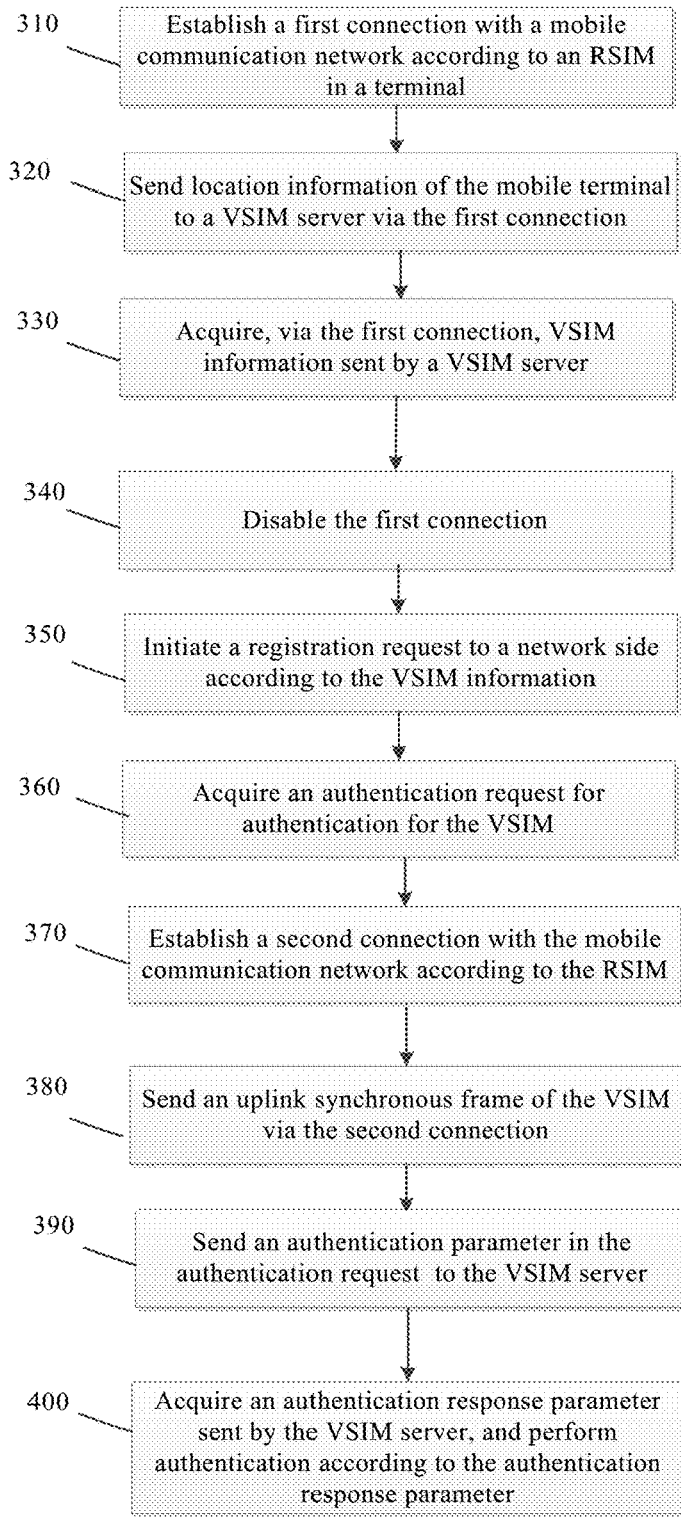
FIG. 3 is a flowchart of a method for authenticating a VSIM according to still another embodiment of the present invention.

FIG. 3 is a flowchart of a method for authenticating a VSIM according to still another embodiment of the present invention. As illustrated in FIG. 3, the method for authenticating a VSIM according to the present invention includes the following steps:

Step 310: A first connection with a mobile communication network is established according to an RSIM in a terminal.

In this step, the first connection is established with the mobile communication network according to the RSIM. The specific implementation method may be referenced to step 110 in the embodiment as illustrated FIG. 1.

In step 320, location information of the mobile terminal is sent to a VSIM server via the first connection.

The mobile terminal sends the current location information of the mobile terminal which is acquired from a network side to the VSIM server after the mobile terminal successfully registered via the RSIM. For example, an MCC or an MNC is sent to the VSIM server, such that the VSIM server allocates one SIM card number from a plurality of SIM cards of the VSIM server to the mobile terminal according to the current location of the mobile terminal.

In step 330, VSIM information sent by the VSIM server is acquired via the first connection, wherein the VSIM information includes a subscriber identification number of the VSIM.

In this step, the VSIM information sent by the VSIM server is acquired via the first connection, and includes the subscriber identification number. The specific implementation method may be referenced to step 120 in the embodiment as illustrated in FIG. 1.

In step 340, the first connection is disabled.

In this step, the first connection established between the mobile terminal and the mobile communication network via the RSIM card is disabled. The specific method for disabling the connection may be based on the related art and conventional protocols. For example, a data channel established between the mobile terminal and the mobile communication network via the RSIM card is disabled, or the first connection is released in other manners. For example, a Radio Resource Control (RRC) connection is released, and the like. Using which manner to disable the first connection is not limited in an embodiment of the present invention.

In step 350, a registration request is initiated to a network side according to the VSIM information of the VSIM.

In this step, registration to the network side is initiated according to the VSIM, and the specific implementation method may be referenced to step 130 in the embodiment as illustrated in FIG. 1.

In step 360, an authentication request for authentication for the VSIM is acquired, the authentication request carrying an authentication parameter to request for authentication for the VSIM.

In this step, the authentication request is acquired, which carries the authentication parameter to request performing the authentication for the VSIM. The specific implementation method may be referenced to step 140 in the embodiment as illustrated FIG. 1. It may be understood that, in the embodiment of the present invention, when the mobile terminal acquires the authentication request for authenticating the VSIM, a period of time is needed; within this period of time, an acquired authentication parameter is sent to the VSIM server and an authentication response to received from the VSIM server, and then an authentication response parameter is sent to the network side for authentication. Therefore, in the embodiment of the present invention, after the mobile terminal acquires the authentication request from the network side via the VSIM, the mobile terminal needs to communicate with the server via the connection established between the mobile terminal and the mobile communication network via the RSIM. Meanwhile, the VSIM process needs to wait for the authentication response sent by the server.

In step 370, a second connection with the mobile communication network is established according to the RSIM.

Since the first connection established between the mobile terminal and the mobile communication network via the RSIM has been disabled in step 340, in this step, a connection with the mobile communication network is reestablished according to the SIM configured in the mobile terminal or coupled to the card slot of the SIM card, such that the mobile terminal is capable of communicating with the VISM server via the connection. For ease of brevity, the connection is called a second connection. In this step, the establishment of the second connection between the mobile terminal and the mobile communication network via the RSIM may be referenced to the related art and conventional protocols, which is not limited in the present invention.

In step 380, an uplink synchronous frame of the VSIM is sent via the second connection.

In this step, the uplink synchronous frame of the VSIM is sent, via the second connection established in step 370, to the network to which registration is initiated via the VSIM. For example, the uplink synchronous frame of the connection between the VSIM and the second communication network via the second connection in a puncturing manner, such that the signaling link for initiating registration to the mobile communication network is maintained according to the IMSI in the VSIM information sent by the VSIM server, and is not released due to consideration that the signaling link of the VSIM is asynchronous. Optionally, in an embodiment of the present invention, a downlink synchronous frame issued by the network side may be received while the uplink synchronous frame of the RSIM is sent.

It should be noted that, in the embodiments of the present invention, sequence numbers of the steps do not denote a sequence of the steps. For example, in this embodiment, sending the uplink synchronous frame of the VSIM via the second connection may be started after the second connection is established until the mobile terminal acquires the authentication response parameter sent by the VSIM server. When the mobile terminal sends the authentication response parameter to the mobile communication network that the mobile terminal desires to register, the uplink synchronous frame of the VSIM may not be continuously sent via the second connection.

In step 390, the authentication parameter in the authentication request is sent to the VSIM server, such that the VSIM server determines an authentication response parameter according to the authentication parameter.

In this step, the authentication parameter is sent to the VSIM server, such that the VSIM server determines the authentication response parameter according to the authentication parameter. The specific implementation method may be referenced to step 270 in the embodiment as illustrated in FIG. 2.

In step 400, the authentication response parameter sent by the VSIM server is acquired, and authentication is performed according to the authentication response parameter.

In this step, the authentication response parameter sent by the VSIM server is acquired, and the authentication is performed according to the authentication response parameter. The specific implementation method may be referenced to step 280 in the embodiment as illustrated in FIG. 2.

The embodiment of the present invention may be implemented via the mobile terminal including two baseband modules, two radio frequency circuits and two antennas, or may be implemented via a DSDA mobile terminal. In particular, the embodiments of the present invention may be implemented via the DSDS mobile terminal. When the embodiments of the present invention are implemented via a DSDS mobile terminal, in an embodiment of the present invention, when sending the authentication parameter to the VSIM server via the second connection established by the mobile terminal and mobile communication network via the RSIM card, and acquiring the authentication response from the VSIM server, the mobile terminal sends the uplink synchronous frame to the mobile communication network to which the mobile terminal desires to register, to maintain the connection when the VSIM process waits for the authentication response sent by the VSIM server, thereby successfully implementing the authentication of the VSIM. In an embodiment of the present invention, the first connection is disabled after the VSIM information sent by the VSIM server is acquired via the first connection, such that the authentication process of the mobile terminal of the DSDS type may be conveniently implemented.

Further, in the method for authenticating a VSIM according to an embodiment of the present invention, the uplink synchronous frame of the VSIM may be specifically sent via the second connection at a predetermined frequency or at a predetermined timeslot. It may be understood that the specific frequency or timeslot for sending the uplink synchronous frame may be defined according to the related art and conventional protocols. For example, when the network side receives the uplink synchronous frame within a predetermined time and considers the connection to be not asynchronous, the frequency for sending the uplink synchronous frame at least satisfies the time requirement of the network side. The mobile communication networks of different modes may be defined according to the protocols thereof, which are not limited in the present invention.

Furthermore, the method for authenticating a VSIM according to an embodiment of the present invention further includes: disabling the second connection.

To be specific, the second connection is disabled after the authentication response parameter sent by the VSIM server is acquired and authentication is performed according to the authentication response parameter.

To be specific, the second connection is disabled via PDP deactivation.

In an embodiment of the present invention, after the VSIM sends the authentication response to the network side, the first connection established with the mobile communication network according to the RSIM is disabled. In this way, while ensuring that the VSIM can be successfully authenticated, waste of the radio resources is further reduced, and the communication roaming fee is saved.

Figure 4:
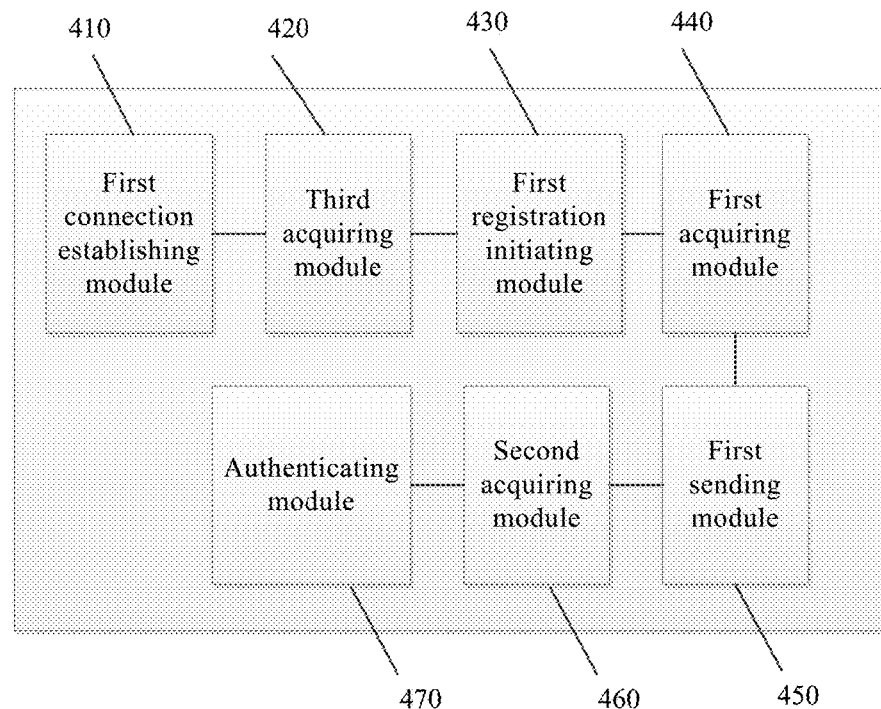
FIG. 4 is a schematic structural diagram of an apparatus for authenticating a VSIM according to one embodiment of the present invention.

FIG. 4 is a schematic structural diagram of an apparatus for authenticating a VSIM according to one embodiment of the present invention. As illustrated in FIG. 4, the apparatus for authenticating a VSIM includes: a first connection establishing module 410, a third acquiring module 420, a first registration initiating module 430, a first acquiring module 440, a first sending module 450, a second acquiring module 460 and an authenticating module 470.

The first connection establishing module 410 is configured to establish a first connection with a mobile communication network according to an RSIM in a terminal.

To be specific, the first link establishing module 410 of the mobile terminal establishes the first connection with the mobile communication network via an RSIM card, wherein the RSIM card may be a SIM card built in the mobile terminal or may be a SIM card coupled to the mobile terminal via a card slot.

When the mobile communication network initiates registration, the mobile communication network may determine the country to which the RSIM card pertains and the operator information of the RSIM card according to the IMSI corresponding to the RSIM reported by the mobile terminal; and when the mobile terminal is successfully registered via the RSIM card, a first connection for international roaming is established via the RSIM card. The mobile terminal may be connected to, or communicate with another device in the mobile communication network via the established first connection.

The third acquiring module 420 is configured to acquire VSIM information sent by a VSIM server via the first connection, the VSIM information including a subscriber identification number of the VSIM.

The third acquiring module 420 of the mobile terminal acquires via the first connection the VSIM information sent by the VSIM server, wherein the VSIM information includes IMSI information of a VSIM. It may be understood that the VSIM server may allocate a VSIM to the mobile terminal by sending the VSIM information to the mobile terminal. It may be still understood that one IMSI uniquely corresponds to one SIM card, and the VSIM server may send the IMSI of the allocated VSIM to the mobile terminal. In this step, the VSIM information sent by the VSIM server is acquired via the first connection, wherein the VSIM information includes the IMSI. It may be still understood that one IMSI uniquely corresponds to one RSIM card in the VSIM server.

The first registration initiating module 430 is configured to initiate a registration request to a network side according to the VSIM information.

When the mobile terminal receives the VSIM information sent by the VSIM server, the first registration initiating module 430 of the mobile terminal initiates registration to the network according to the IMSI information in the VSIM information. When initiating registration to the network according to the IMSI information, the first registration initiating module 430 of the mobile terminal may send to the mobile communication network an IMSI number sent by the VSIM server, and log in to the mobile communication network via the IMSI. It should be noted that it may be determined according to the related art and the protocols as to which mode of mobile communication network to which registration is initiated, which is not limited in the present invention. It may be understood that the mobile communication network which the IMSI sent via the VSIM server logs in to may be different from or may be the same as the mobile communication network that establishes the first connection with the mobile terminal via the RSIM card, which is not limited in the present invention. For ease of description, in an embodiment of the present invention, the mobile communication network that establishes the first connection with the mobile terminal via the RSIM card is called a first mobile communication network, and the mobile communication network that establishes a second connection with the mobile terminal via the IMSI corresponding to the VSIM is called a second mobile communication network. Upon receiving a registration request, the first registration initiating module 430 initiates an authentication request, and sends the authentication request to the mobile terminal.

The first acquiring module 440 is configured to acquire an authentication request for authentication for the VSIM, the authentication request carrying an authentication parameter to request for authentication for the VSIM.

The first acquiring module 440 of the mobile terminal acquires the authentication request issued by the network side, wherein the authentication request carries the authentication parameter to perform the authentication for the VSIM.

The first sending module 450 is configured to send the authentication parameter acquired by the first acquiring module to the VSIM server, such that the VSIM server determines an authentication response parameter according to the authentication parameter.

However, in an embodiment of the present invention, since the authentication circuit for performing authentication calculation is configured in the VSIM server, after the first acquiring module 440 of the mobile terminal acquires the authentication request, the first sending module 450 of the mobile terminal sends the authentication parameter in the authentication request to the VSIM server, such that the authentication circuit of the SIM card configured in the VSIM server determines an authentication response parameter according to the authentication parameter. To be specific, the authentication parameter for performing authentication calculation by the authentication circuit of the removable SIM card configured in the VSIM server may be sent to the VSIM server.

The second acquiring module 460 is configured to acquire the authentication response parameter sent by the VSIM server.

The second acquiring module 460 of the mobile terminal acquires the authentication response parameter sent by the VSIM server. It may be understood that the authentication response parameter is the authentication parameter in the authentication request issued by the second mobile communication network and acquired according to the mobile terminal, and calculated and determined by the authentication circuit of the SIM card in the VSIM server.

The authenticating module 470 is configured to perform authentication according to the authentication response parameter acquired by the second acquiring module.

Upon acquiring the authentication response parameter from the VSIM server, the authenticating module 470 of the mobile terminal sends the authentication response parameter to the network side to which the VSIM is to be registered, for authentication.

In an embodiment of the present invention, when the VSIM of the mobile terminal initiates a registration event or other events triggering the authentication to the second mobile communication network, upon receiving the authentication request issued by the second mobile communication network, the mobile terminal sends the authentication parameter in the authentication request to the VSIM server, and performs authentication without special authorization from the operator. In this way, the VSIM is authenticated by using only a few roaming resources, and the mobile terminal is capable of conveniently accesses the network via the VSIM.

Further, the apparatus according to this embodiment: a second sending module, configured to send an uplink synchronous frame of the RSIM. The uplink synchronous frame of the RSIM card is sent to the first mobile communication network which the RSIM card is logged in to according to the RSIM card.

Figure 5:
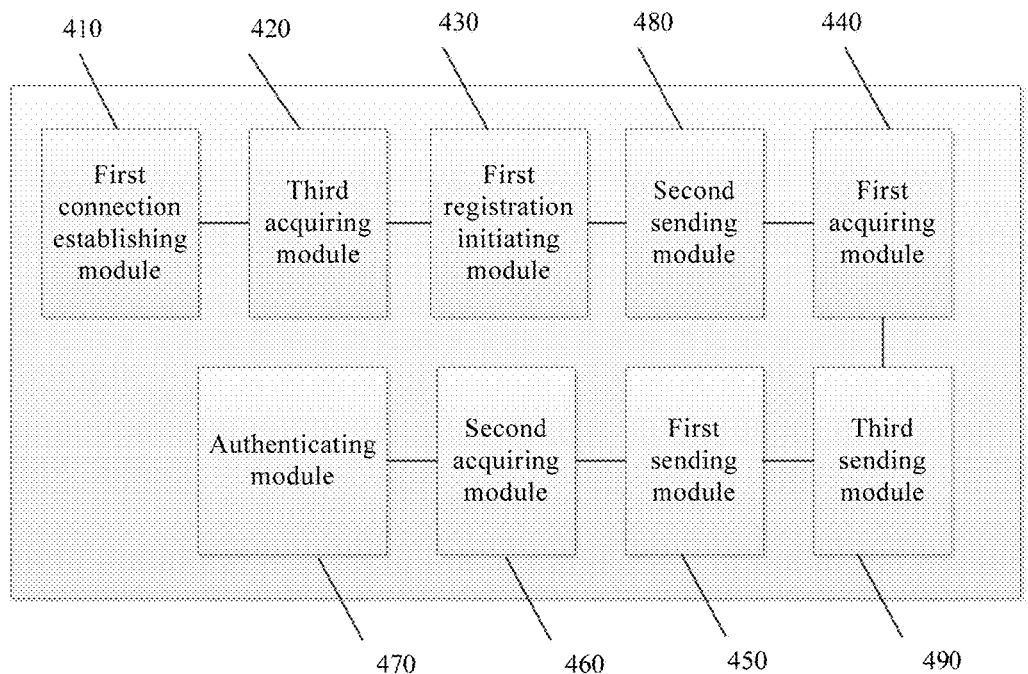
FIG. 5 is a schematic structural diagram of an apparatus for authenticating a VSIM according to another embodiment of the present invention.

FIG. 5 is a schematic structural diagram of an apparatus for authenticating a VSIM according to another embodiment of the present invention. As illustrated in FIG. 5, the apparatus for authenticating a VSIM according to the present invention includes a first connection establishing module 410, a third acquiring module 420, a first registration initiating module 430, a first acquiring module 440, a first sending module 450, a second acquiring module 460 and an authenticating module 470. The specific operations of the above modules may be referenced to the corresponding modules in the embodiment as illustrated in FIG. 4. In addition, the apparatus for authenticating a VSIM further includes a second sending module 480 and a third sending module 490.

The second sending module 480 is configured to send an uplink synchronous frame of the RSIM.

The second sending module 480 sends the uplink synchronous frame of the RSIM card to the first mobile communication network which the RSIM card is logged in to according to the RSIM card. The second sending module 480 may send the uplink synchronous frame of the RSIM while, before and after initiating registration according to the VSIM. To be specific, the uplink synchronous frame of the RSIM may be sent to the first mobile communication network via the first connection according to a predetermined frequency or time.

To be specific, when the mobile terminal includes two baseband modules, two radio frequency circuits and two antennas, the second sending module 480 may send the uplink synchronous frame of the RSIM card the first mobile communication network via the first connection established via the RSIM card, to maintain that the first connection is not released by the network side. Optionally, when the mobile terminal includes one baseband module, two radio frequency circuits and two antennas, that is, the mobile terminal is a DSDA device, the second sending module 480 may also send the uplink synchronous frame of the RSIM card to the first mobile communication network via the first connection established by the mobile terminal via the RSIM card, to maintain that the first connection is not released by the network side. Optionally, When the mobile terminal includes a baseband module, two radio frequency circuits and one antennas, that is, the mobile terminal is a DSDS device, the second sending module 480 may sends the uplink synchronous frame of the RSIM to the first mobile communication network via a signaling link established between the VSIM and the second mobile communication network. For example, the uplink synchronous frame may be sent in a puncturing manner, and the sent uplink synchronous frame carries an RNTI, to maintain that the first connection is not released by the network side. It should be noted that in an embodiment of the present invention, a downlink synchronous frame issued by the network side may be received while the uplink synchronous frame of the RSIM is sent.

The third sending module 490 is configured to send an uplink synchronous frame of the VSIM via the first connection.

Upon acquiring the authentication request with respect to the IMSI corresponding to the VSIM sent by the second mobile communication network, the mobile terminal sends the authentication parameter to the VSIM server and acquires an authentication response parameter from the VSIM server, and afterwards, sends the authentication response parameter to the second mobile communication network. For the network side, upon sending the authentication request to the mobile terminal, the network side waits for an authentication response sent by the mobile terminal, and judges whether the IMSI is authorized according to the authentication response sent by the mobile terminal. During this process, the third sending module 490 of the mobile terminal sends the uplink synchronous frame of the VSIM to the second mobile communication network which initiates registration according to the IMSI, such that the second mobile communication network does not consider that a problem of link failure exists in the VSIM, and releases a signaling link of the VSIM. It may be determined according to the requirements of different modes of communication systems and the conventional protocols as how to send an uplink synchronous frame and which frequency or which time or frequency point is employed to send the uplink synchronous frame, which is not limited in the present invention.

To be specific, when the mobile terminal includes two baseband modules, two radio frequency circuits and two antennas, the third sending module 490 may send the uplink synchronous frame to the second mobile communication network via the signaling link initiated to the second mobile communication network via the VSIM, to maintain that the signaling link is not released by the network side. When the mobile terminal includes two baseband modules, two radio frequency circuits and two antennas, that is, the mobile terminal is a DSDA device, the third sending module 490 may send the uplink synchronous frame to the second mobile communication network via the signaling link initiated to the second mobile communication network via the VSIM, to maintain that the signaling link is not released by the network side. Optionally, when the mobile terminal includes a baseband module, two radio frequency circuits and an antenna, that is, the mobile terminal is a DSDS device, the third sending module 490 may sends the uplink synchronous frame of the VSIM to the second mobile communication network via the first connection established between the RSIM in the mobile terminal and the first mobile communication network. For example, the uplink synchronous frame may be sent in a puncturing manner, and the sent uplink synchronous frame carries an RNTI, to maintain that the signaling link of the VSIM is not released by the network side. It should be noted that in an embodiment of the present invention, a downlink synchronous frame issued by the network side may be received while the uplink synchronous frame of the VSIM is sent.

Figure 6:
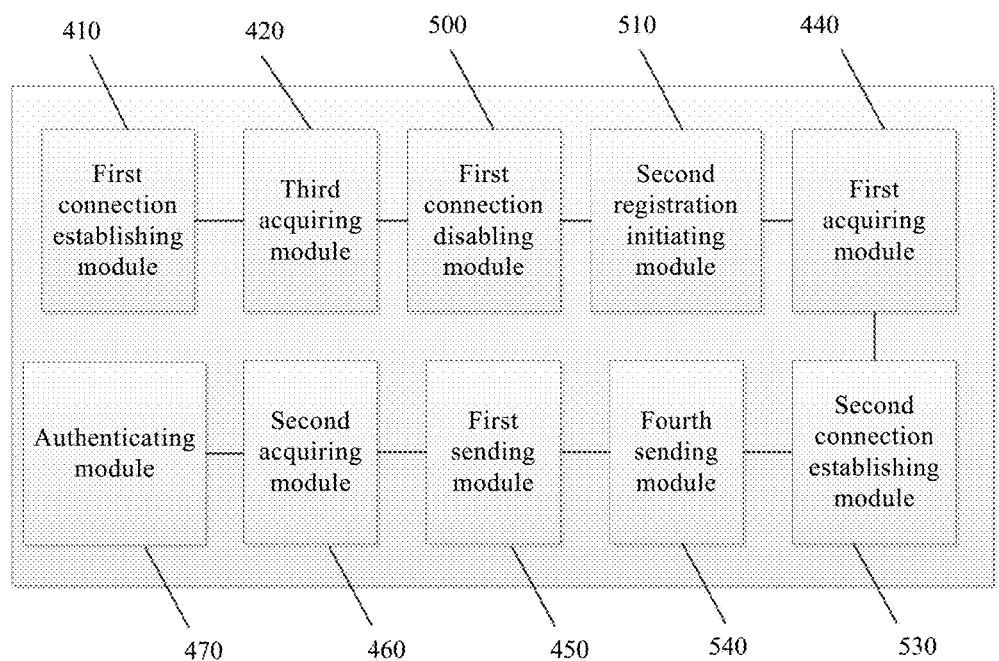
FIG. 6 is a schematic structural diagram of an apparatus for authenticating a VSIM according to still another embodiment of the present invention.

FIG. 6 is a schematic structural diagram of an apparatus for authenticating a VSIM according to still another embodiment of the present invention. As illustrated in FIG. 6, the apparatus for authenticating a VSIM according to the present invention includes a first connection establishing module 410, a third acquiring module 420, a first acquiring module 440, a first sending module 450, a second acquiring module 460 and an authenticating module 470. The specific operations of the above modules may be referenced to the corresponding modules in the embodiment as illustrated in FIG. 4. In addition, the apparatus for authenticating a VSIM further includes a first connection disabling module 500, a second registration initiating module, a second connection establishing module 530 and a fourth sending module 540.

The first connection disabling module 500 is configured to disable the first connection established by the first connection establishing module.

The first connection disabling module 500 disables the first connection established by the first connection establishing module 410 of the mobile terminal between the mobile terminal and the mobile communication network via the RSIM card. The specific method for disabling the connection may be based on the related art and conventional protocols. For example, a data channel established between the mobile terminal and the mobile communication network via the removable SIM card is disabled, or the first connection is released in other manners. For example, an RRC connection is released, and the like. Using which manner to disable the first connection is not limited in an embodiment of the present invention.

The second registration initiating module 510 is configured to initiate registration to the network side according to the VSIM information after the connection disabling module 500 disables the first connection.

The second registration initiating module 510 initiates registration to the network side according to the VSIM after the connection disabling module disables the first connection. The specific operations may be referenced to the first registration initiating module 430 in the embodiment as illustrated in FIG. 4. In an embodiment of the present invention, the second registration initiating module 510 and the first registration initiating module 430 may be the same module or unit, or may be different modules or units.

The second connection establishing module 530 is configured to establish a second connection with the mobile communication network according to the RSIM after the first acquiring module 440 acquires the authentication request.

Since the first connection disabling module 500 has disabled the first connection established between the mobile terminal and the mobile communication network via the RSIM, the second connection establishing module 530 establishes a connection with the mobile communication network according to the SIM configured in the mobile terminal or coupled to the card slot of the SIM card. For ease of brevity, the connection is called a second connection. It may be understood that, via the second connection established by the second connection establishing module 530, the mobile terminal is capable of communicating with the VSIM server, sending the authentication parameter to the VSIM server, and acquiring the authentication response from the VSIM server.

The fourth sending module 540 is configured to send an uplink synchronous frame of the VSIM via the second connection.

The fourth sending module 540 sends, via the established second connection, the uplink synchronous frame the network to which registration is initiated via the VSIM, such that the signaling link for initiating registration to the mobile communication network is maintained according to the IMSI in the VSIM information sent by the VSIM server. For example, the uplink synchronous frame may be sent in a puncturing manner, and the sent uplink synchronous frame carries an RNTI, such that the connection is not released by the network side due to the network side considers the signaling link of the VSIM is asynchronous. It should be noted that in an embodiment of the present invention, a downlink synchronous frame issued by the network side may be received while the uplink synchronous frame of the VSIM is sent. The fourth sending module 540 and the second sending module 480 may be the same unit or module, or may be different units or modules (as illustrated in FIG. 6, the fourth sending module 540 and the second sending module 480 are two independent units or modules. For brevity of description, the fourth sending module 540 and the second sending module 480 not illustrated in FIG. 6 are structured into the same unit or module).

In an embodiment of the present invention, after the VSIM sends the authentication response to the network side, the first connection established with the mobile communication network according to the RSIM is disabled. In this way, while ensuring that the VSIM can be successfully authenticated, waste of the radio resources is further reduced, and the communication roaming fee is saved.

Figure 7:
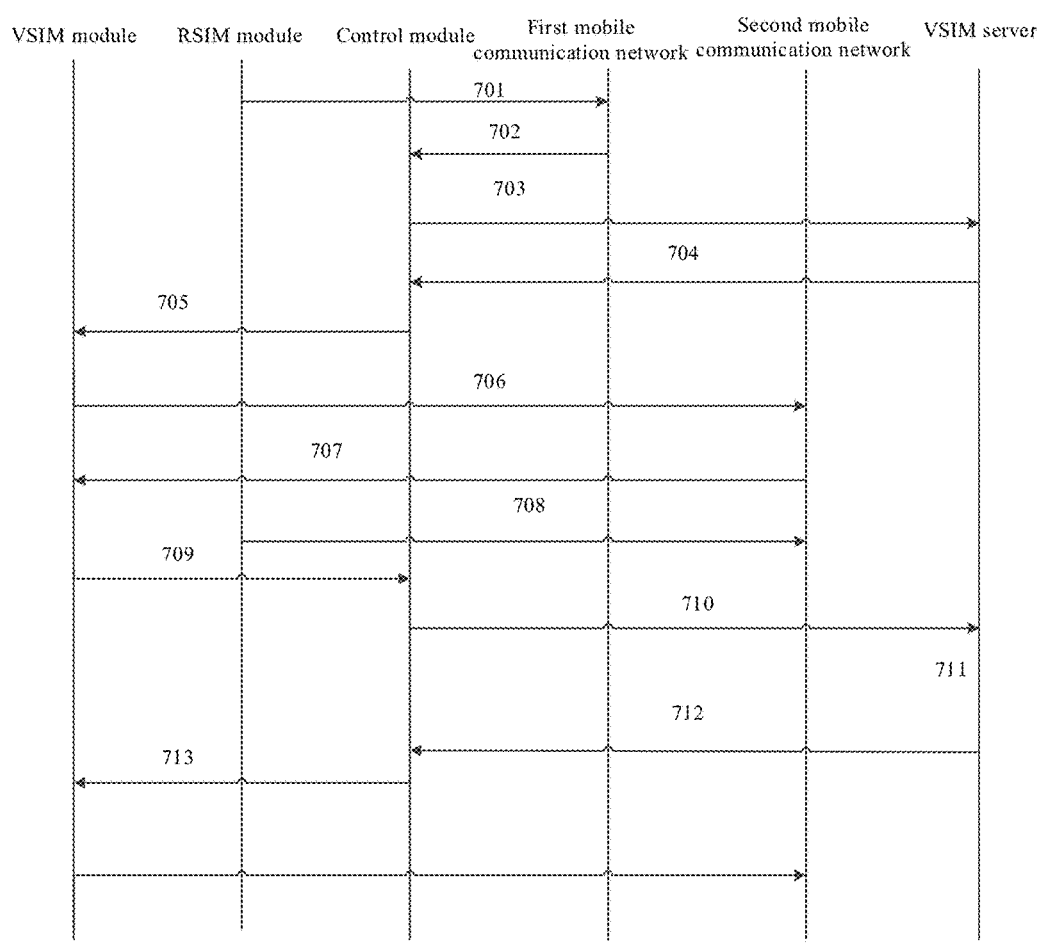
FIG. 7 is a signaling interaction diagram of the method for authenticating a VSIM according to the present invention.

FIG. 7 is a signaling interaction diagram of the method for authenticating a VSIM according to the present invention. As illustrated in FIG. 7, the method for authenticating a VSIM according to the present invention includes the following steps performed by a control module, an RSIM module and a VSIM module of a mobile terminal, and a first mobile communication network, a second mobile communication network and a VSIM server.

701. Registration is initiated to the first mobile communication network according to an RSIM in a terminal, a PDP context of the RSIM is activated, an IP address is acquired, and a data connection is established.

702. The first mobile communication network sends location information indicating successful registration via the RSIM to the control module, for example, an MCC and an MNC.

703. The control module sends the MCC and the MNC to the VSIM server.

704. The VSIM server allocates an IMSI to the mobile terminal according to the received MCC and MNC of the mobile terminal, wherein the IMSI is an IMSI uniquely corresponding to one SIM card in a plurality of RSIM cards in the VSIM server.

705. The control module sends the IMSI sent by the VSIM server to the VSIM module.

706. The VSIM module initiates registration to the second mobile communication network according to the acquired IMSI.

707. The second mobile communication network sends an authentication request, and a signaling link between the VSIM module and the second mobile communication network is established.

708. The RSIM module sends an uplink synchronous frame of the VSIM to the second mobile communication network, to maintain that the signaling link between the VSIM module and the second mobile communication network is not asynchronous; and a downlink synchronous frame may be received while the uplink synchronous frame is received from the network side, which, is however, not limited in the present invention.

709. The VSIM module sends the authentication request or the authentication parameter in the authentication request sent by the second mobile communication network to the control module.

710. The control module sends the authentication request or the authentication parameter in the authentication request to the VSIM server.

711. The SIM card corresponding to the IMSI in the VSIM server determines an authentication response according to the authentication request or the authentication parameter in the authentication request.

712. The VSIM server sends the determined authentication response to the control module of the mobile terminal.

713. The control module sends the authentication response to the VSIM module.

714. The VSIM module sends the authentication response to the second mobile communication network for authentication.

In this embodiment, after step 707 and before step 714, an uplink synchronous frame of the VSIM may be sent to the second mobile communication network, such that the second mobile communication network is capable of sensing the VSIM, to ensure that a signaling link between the VISM and the second mobile communication network is not disabled, such that the VSIM waits for the authentication response from the VSIM server and is thus successfully authenticated.

Figure 8:
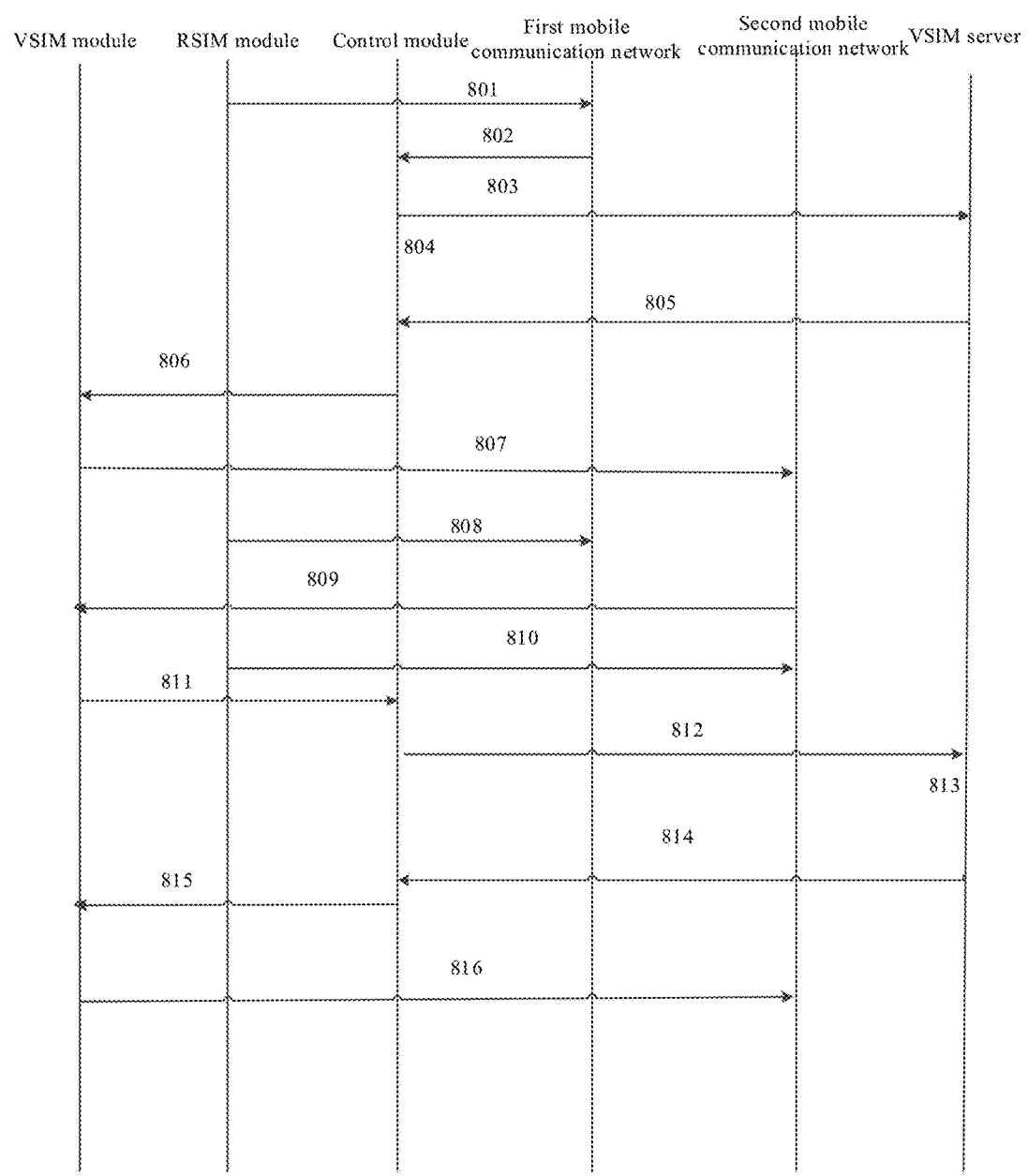

FIG. 8 is a signaling interaction diagram of the method for authenticating a VSIM according to the present invention. As illustrated in FIG. 8, the method for authenticating a VSIM according to the present invention includes the following steps performed by a control module, an RSIM module and a VSIM module of a mobile terminal, and a first mobile communication network, a second mobile communication network and a VSIM server.

801. Registration is initiated to the first mobile communication network according to an RSIM in a terminal, a PDP context of the RSIM is activated, an IP address is acquired, and a data connection is established.

802. The first mobile communication network sends location information indicating successful registration via the RSIM to the control module, for example, MCC and MNC.

803. The control module sends the MCC and the MNC to the VSIM server.

804. The control module releases the signaling link between the RSIM and the first mobile communication network, and disables the data connection.

805. The VSIM server allocates an IMSI to the mobile terminal according to the received MCC and MNC of the mobile terminal, wherein the IMSI is an IMSI uniquely corresponding to one SIM card in a plurality of RSIM cards in the VSIM server.

806. The control module sends the IMSI sent by the VSIM server to the VSIM module.

807. The VSIM module initiates registration to the second mobile communication network according to the acquired IMSI.

808. The data connection between the RSIM and the first mobile communication network is reestablished.

809. The second mobile communication network sends an authentication request, and a signaling link between the VSIM module and the second mobile communication network is established.

810. The RSIM module sends an uplink synchronous frame of the VSIM to the second mobile communication network, to maintain that the signaling link between the VISM module and the second mobile communication network is asynchronous.

811. The VSIM module sends the authentication request or the authentication parameter in the authentication request sent by the second mobile communication network to the control module.

812. The control module sends the authentication request or the authentication parameter in the authentication request to the VSIM server.

813. The SIM card corresponding to the IMSI in the VSIM server determines an authentication response according to the authentication request or the authentication parameter in the authentication request.

814. The VSIM server sends the determined authentication response to the control module of the mobile terminal.

815. The control module sends the authentication response to the VSIM module.

816. The VSIM module sends the authentication response to the second mobile communication network for authentication.

Following step 816, the method may further includes disabling the data connection established between the RSIM and the first mobile communication network in step 808.

In this embodiment, after the VSIM initiates registration to the second mobile communication network and sends an authentication response to the second mobile communication network, an uplink synchronous frame of the VSIM may be sent to the second mobile communication network, such that the second mobile communication network is capable of sensing the VSIM, to ensure that a signaling link between the VISM and the second mobile communication network is not disabled, such that the VSIM waits for the authentication response from the VSIM server and is thus successfully authenticated.

A person skilled in the art would clearly acknowledge that for ease and brevity of description, the apparatuses are described by only using division of the above functional modules as examples. In practice, the functions may be assigned to different functional modules for implementation as required. To be specific, the internal structure of the apparatus is divided into different functional modules to implement all or part of the above-described functions. The specific working processes of the system, apparatus and units described above may be referenced to the corresponding process in the method embodiments, which are not described herein any further.

In the several embodiments provided in the present invention, it should be understood that the disclosed system, apparatus and method may be practiced in other manners. The above described device embodiments are merely illustrative. For example, the divisions of the modules or units are merely logical function divisions and may be other divisions in actual practice. For example, multiple units or components may be combined or integrated into another system, or some features can be ignored or not performed. In addition, the displayed or discussed mutual couplings or direct couplings or communication connections are practiced through some interfaces. The indirect couplings or communication connections between the apparatuses or units may be practiced in electronic, mechanical or other forms.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all the units may be selected according to the actual needs to achieve the objectives of the technical solutions of the embodiments.

In addition, various functional units according to the embodiments of the present invention may be integrated in a processing unit, or may be each independently and physically present; alternatively, one or more than one units are integrated in a unit. The above integrated unit may be practiced in the form of hardware, and may also be practiced in the form of a software functional unit.

If the integrated unit is implemented in the form of a software functional module, and is sold or used as an independent product, the integrated unit may also be stored in a computer readable storage medium. Based on such understandings, the technical solutions or part of the technical solutions disclosed in the present invention that makes contributions to the prior art may be essentially embodied in the form of a software product. The software product may be stored in a storage medium. The software product includes a number of instructions that enable a computer (a PC, a server, a network device, or the like) device to execute all or a part of the steps of the methods provided in the embodiments of the present invention. The storage media include various media capable of storing program code, for example, a U disk, a mobile hard disk, a read-only memory (ROM), a random access memory (RAM), a magnetic disk, or a compact disc read-only memory (CD-ROM).

It should be finally noted that the above-described embodiments are merely for illustration of the present invention, but are not intended to limit the present invention. Although the present invention is described in detail with reference to these embodiments, a person skilled in the art may also make various modifications to the technical solutions disclosed in the embodiments, or make equivalent replacements to a part of the technical features contained therein. Such modifications or replacement, made without departing from the principles of the present invention, shall fall within the scope of the present invention.

What is claimed is:

1. A method for authenticating a virtual subscriber identity module (VSIM), comprising:
    establishing a first connection with a mobile communication network according to a removable subscriber identity module (RSIM) in a terminal;
    acquiring VSIM information sent by a VSIM server via the first connection, the VSIM information comprising a subscriber identification number of the VSIM;
    disabling the first connection;
    initiating a registration request to a network side according to the VSIM information;
    acquiring an authentication request for authentication for the VSIM;
    establishing a second connection with the mobile communication network according to the RSIM;
    sending an uplink synchronous frame of the VSIM via the second connection;
    sending an authentication parameter in the authentication request to the VSIM server, such that the VSIM server determines an authentication response parameter according to the authentication parameter;
    acquiring the authentication response parameter sent by the VSIM server; and
    performing authentication according to the authentication response parameter.

2. The method according to claim 1, further comprising: sending an uplink synchronous frame of the RSIM.

3. The method according to claim 2, wherein:
    the sending the authentication parameter to the VSIM server comprises: sending the authentication parameter to the VSIM server via the first connection;
    the acquiring the authentication response parameter sent by the VSIM server comprises: acquiring, via the first connection, the authentication response parameter sent by the VSIM server; and
    the method further comprises: sending an uplink synchronous frame of the VSIM via the first connection.

4. The method according to claim 1, wherein upon the acquiring the authentication response parameter sent by the VSIM server, the method further comprises: disabling the second connection.

5. An apparatus for authenticating a virtual subscriber identity module (VSIM), comprising:
    a processor, configured to establish a first connection with a mobile communication network according to a removable subscriber identity module (RSIM) in a terminal; acquire, via the first connection, VSIM information sent by a VSIM server, the VSIM information comprising a subscriber identification code of the VSIM; disable the first connection; initiate a registration request to a network side according to the VSIM information; acquire an authentication request for authentication for the VSIM, the authentication request carrying an authentication parameter to request for authentication for the VSIM; and establish a second connection with the mobile communication network according to the RSIM; and
    a transmitter, configured to send an uplink synchronous frame of the VSIM via the second connection; and send the authentication parameter to the VSIM server, such that the VSIM server determines an authentication response parameter according to the authentication parameter;
    wherein the processor is further configured to acquire the authentication response parameter sent by the VSIM server; and perform authentication according to the authentication response parameter.

6. The apparatus according to claim 5, wherein the transmitter is further configured to send an uplink synchronous frame of the RSIM.

7. The apparatus according to claim 6, wherein: the transmitter is configured to send the authentication parameter to the VSIM server via the first connection; the processor is configured to acquire, via the first connection, the authentication response parameter sent by the VSIM server; and the transmitter is further configured to send an uplink synchronous frame of the VSIM via the first connection.

8. The apparatus according to claim 5, wherein the processor is further configured to disable the second connection after the processor acquires the authentication response parameter sent by the VSIM server.

9. An apparatus, comprising a processor coupled with a non-transitory storage medium storing executable instructions; wherein the executable instructions, when executed by the processor, cause the processor to:
    establish a first connection with a mobile communication network according to a removable subscriber identity module (RSIM) in a terminal;
    acquire VSIM information sent by a VSIM server via the first connection, the VSIM information comprising a subscriber identification number of the VSIM;
    disable the first connection;
    initiate a registration request to a network side according to the VSIM information;
    acquire an authentication request for authentication for the VSIM;
    establish a second connection with the mobile communication network according to the RSIM;
    send an uplink synchronous frame of the VSIM via the second connection;
    send an authentication parameter in the authentication request to the VSIM server, such that the VSIM server determines an authentication response parameter according to the authentication parameter;
    acquire the authentication response parameter sent by the VSIM server; and
    perform authentication according to the authentication response parameter.

10. The apparatus according to claim 9, wherein the executable instructions further cause the processor to send an uplink synchronous frame of the RSIM.

11. The apparatus according to claim 10, wherein the executable instructions further cause the processor to:
    send the authentication parameter to the VSIM server via the first connection;
    acquire, via the first connection, the authentication response parameter sent by the VSIM server; and
    send an uplink synchronous frame of the VSIM via the first connection.

12. The method according to claim 9, wherein the executable instructions further cause the processor to, upon acquiring the authentication response parameter sent by the VSIM server, disable the second connection.

* * * * *